3,177,198
WATER-INSOLUBLE AZO DYESTUFFS
Konrad Weis, Cologne-Stammheim, Edgar Siegel and Otto Bayer, Leverkusen, and Gerhard Wolfrum, Opladen, Germany, assignors to Farbenfabriken Bayer Aktiengesellschaft, Leverkusen, Germany, a corporation of Germany
No Drawing. Filed Feb. 28, 1961, Ser. No. 92,137
Claims priority, application Germany, Mar. 5, 1960, F 30,693; July 7, 1960, F 31,608
7 Claims. (Cl. 260—152)

The object of the invention is to provide water-insoluble azo dyestuffs of the formula $$(A-N=N-B)-(W-\underset{R}{\overset{|}{C}H}-CH_2-SO_2-Z)_n \qquad (I)$$

In the above formula A and B denote aromatic-carbocyclic or heterocyclic radicals, W denotes a radical

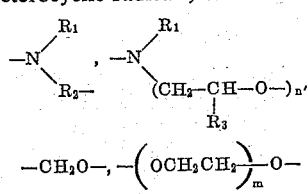

or $-COO-CH_2CH_2O-$, and Z stands for an alkyl radical containing 1 to 3 carbon atoms. If W stands for a radical other than

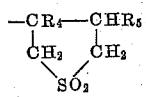

the radicals R and Z may also be linked with one another with the formation of a heterocyclic radical of the formula $$\begin{array}{c} -CR_4-CHR_5 \\ | \quad\quad\quad | \\ CH_2 \quad CH_2 \\ \diagdown\;\diagup \\ SO_2 \end{array}$$

$R_2$ denotes a direct linkage or an alkylene radical containing 1 to 2 carbon atoms. $R_1$ denotes hydrogen, alkyl or acyl, whereby the alkyl or acyl radical may also be a constituent of a heterocyclic ring together with the nitrogen atom; R, $R_3$, $R_4$ and $R_5$ denote hydrogen or alkyl radicals; $m$, $n$ stand for whole numbers from 1 to 3 and $n'$ stands for a whole number of 0–3, preferably 0–1.

The new dyestuffs are to be free from sulfonic acid and carboxylic acid groups, but may otherwise contain any substituents usually present in azo dyestuffs such as cyan, halogen, alkyl, nitro, alkoxy, cyanalkyl, hydroxyalkyl, acyloxyalkyl, alkoxyalkyl, hydroxyalkoxyalkyl and sulphone groups. According to definition, alkyl radicals also include isoalkyl radicals.

The water-insoluble dyestuffs according to the present invention are produced by coupling aromatic-carbocyclic or heterocyclic diazo compounds corresponding to the radical A with azo components corresponding to the radical B, and choosing the components in such a manner that the final dyestuffs contain 1 to 3 groupings of the formula $$-W-\underset{R}{\overset{|}{C}H}-CH_2-SO_2-Z \qquad (II)$$

wherein W, R and Z have the aforesaid significance, but do not contain any water-solubilizing, acid-dissociating groups.

For this purpose, for example, starting components are chosen which already contain the grouping (II). Components which meet this condition may be produced, for example, by condensing in diazo or coupling components, preferably in the presence of acid-binding agents, a grouping $-NH-R_1$ with a haloalkylsulphone $$Z-SO_2-CH_2-\underset{R}{\overset{|}{C}H}-hal$$

wherein R has the above significance and "hal" represents a reactive halogen atom, or by adding an alkylvinyl sulphone by means of an acid catalysis, thus obtaining components with the grouping

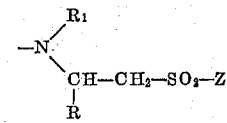

It is also possible to react a grouping

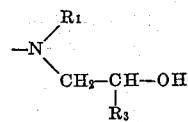

with an alkylvinyl sulphone, for example, methylvinyl sulphone. In this way there are obtained components with the grouping

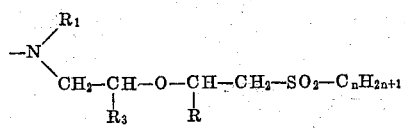

The same processes may obviously also be applied to previously formed azo dyestuffs of the formula $$A-N=N-B$$

provided the latter contain groupings of the formulae

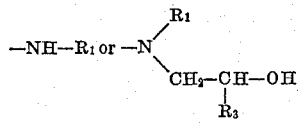

Groupings of the aforesaid type wherein the radicals R and Z are linked with one another with the formation of a hetero ring

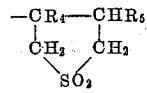

may be introduced into the starting components or into azo dyestuffs themselves, by reacting, for example according to the process of German Patent No. 682,079, in these present groups

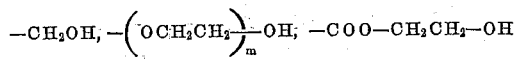

or

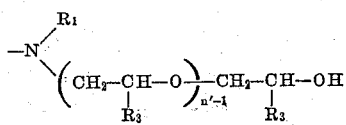

with butadiene sulphone (-thiophendihydro-1,1'-dioxide) or its 3,4-alkyl-substitution products. By this method there may be prepared inter alia the following starting components which are used as diazo or coupling components for the production of the new azo dyestuffs:

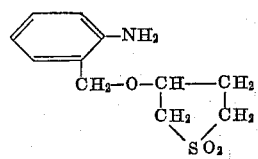

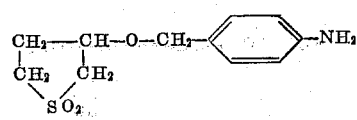

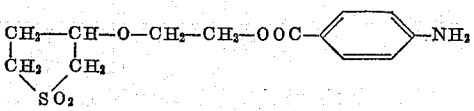
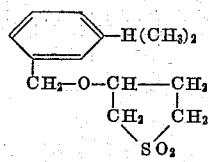
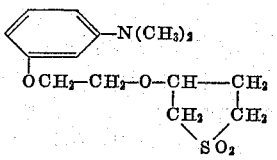
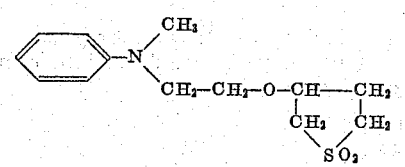
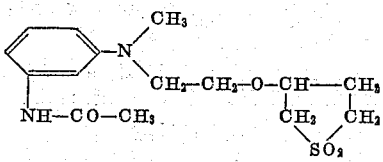
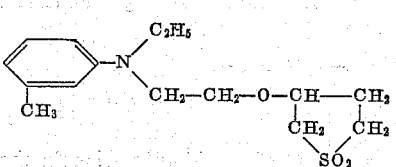
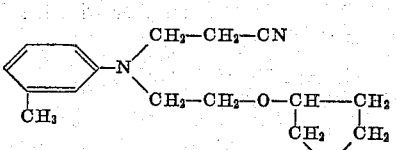
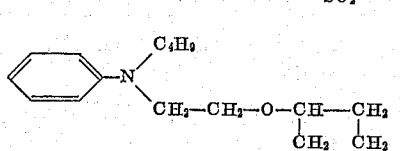
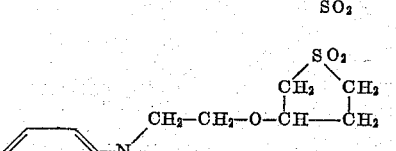
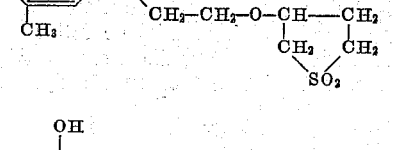
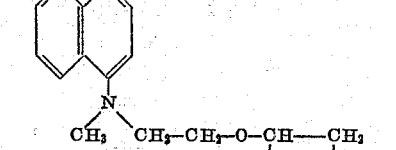

Diazo and coupling components containing the groupings $$-CH_2-OCH_2CH_2SO_2-Z, \quad -\left(OCH_2CH_2\right)_m-OCH_2CH_2SO_2-Z$$
$$-COO-CH_2CH_2-O-CH_2CH_2SO_2-Z$$

and

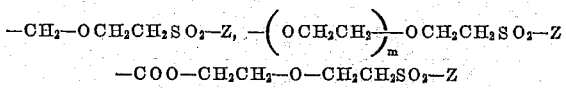

are obtained by addition of vinylalkyl sulphones or their substitution products to the groupings $-CH_2OH$, $$-\left(OCH_2CH_2\right)_m-OH, \quad -COOCH_2CH_2OH$$

or

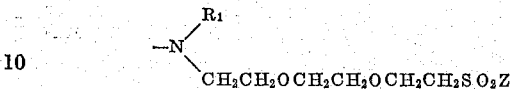

or by condensation with β-haloalkyl sulphones. The following components may thus be obtained inter alia together with some of the compounds which can be obtained according to the process described in column 2.

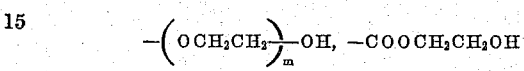

and which are also listed below:

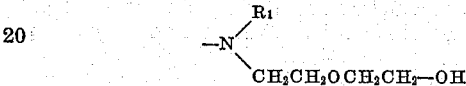
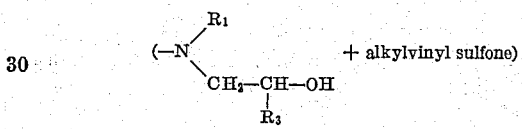
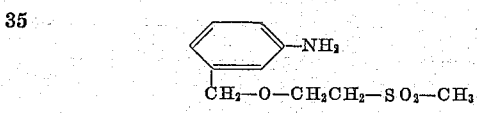
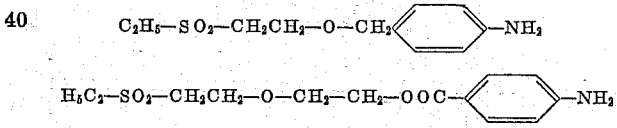
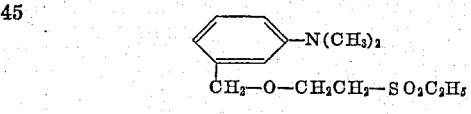
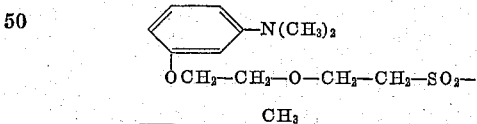
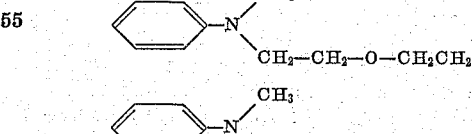
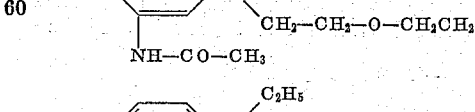
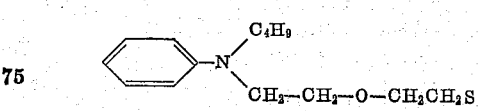

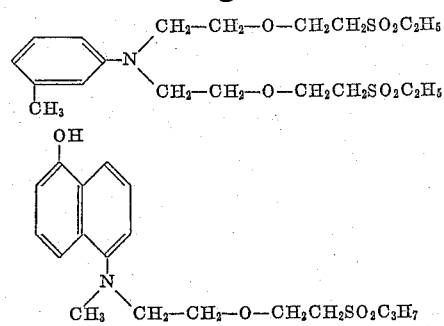

This process also may be applied to the previously synthesized azo dyestuffs provided the latter possess the above mentioned —OH group-containing substituents.

The dyestuffs according to the invention are eminently suitable for the dyeing of terephthalic acid ester fibres, polyamide fibres, polyvinyl fibres and cellulose ester fibres. The dyeings on terephthalic acid ester fibres are very fast to sublimation and wet treatment, and are generally also very fast to light. Since the dyestuffs are insoluble or sparingly soluble in water, the dyeing process is advantageously carried out in the presence of dispersing agents; in order to accelerate the dyeing process, swelling agents may also be added to the dyebath, if desired.

In the following examples which are given for the purpose of illustrating the invention, the parts are parts by weight if not otherwise indicated.

EXAMPLE 1

2.5 parts of 2-cyano-4-nitraniline are dissolved in 25 parts of concentrated sulphuric acid and diazotised at 0° C. for 30 minutes with 4.6 parts of nitrosyl-sulphuric acid. After pouring the solution into ice water and freeing it from insoluble impurities by filtration, it is added to a solution of 3.93 parts of the addition product of N-methyl-N-hydroxyethyl-aniline to vinylethyl sulphone in dilute hydrochloric acid. Coupling sets in immediately and is completed by buffering. The dyestuff thus obtained and having the constitution yields on terephthalic acid ester fibres, when dyed in conventional manner with the addition of dispersing and swelling agents, a clear ruby red shade of very good fastness properties.

The azo component used is prepared in the following manner:

A mixture of 45.3 parts of N-methyl-N-β-hydroxyethyl aniline and 1 part of sodium methylate is heated to 60° C. and then slowly treated with 36 parts of vinyl-ethyl sulphone. The reaction mixture is subsequently stirred at 50–70° C. for 3–5 hours and then added with stirring to about 200 parts of water. The aqueous phase is separated after neutralisation and the residual viscous portion heated to 140–150° C. in a vacuum for the removal of the unreacted oxethylated amine. 63 parts of a yellow oil are obtained having the constitution

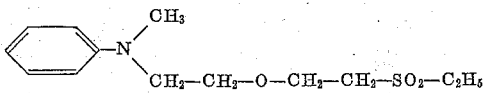

Analysis: S calculated 11.83%, found 11.85%.

In Table I further valuable dyestuffs are listed which are obtainable by a suitable replacement of the diazo component used in Example 1. The dyestuffs are characterized by the shade of the dyeing on terephthalic acid ester fibres.

Table 1

| Example | Diazo component | Azo component | Shade |
|---|---|---|---|
| 2 | 4-thiocyano-1 aminobenzene | As Example 1 | Yellow. |
| 3 | 4-amino-benzaldehyde | do | Orange. |
| 4 | 2,4-dichloraniline | do | Yellow. |
| 5 | 2-amino-benzthiazole | do | Red. |
| 6 | 2-amino-5-methyl-1,3,4-thiodiazole | do | Orange. |
| 7 | 2-amino-5-thiocyano-4-methyl-thiazole-(1,3). | do | Bordeaux. |
| 8 | 2,4-dicyananiline | do | Red. |
| 9 | 3-phenyl-5-amino-thiodiazole (1,2,4) | do | Scarlet. |
| 10 | 2-chloro-4-nitraniline | do | Red. |
| 11 | 2,6-dichloro-4-nitraniline | do | Orange-brown. |
| 12 | 3,5-dichloro-4-amino-benzene-sulphonamide. | do | Yellow. |

EXAMPLE 13

3 parts of 2,6-dichloro-4-nitraniline are dissolved in 15 parts of sulphuric acid of 60° Baumé, and then diazotised at about 40° C. for 30 minutes with 4.6 parts of nitrosyl-sulphuric acid. After stirring the solution into ice water and liberating it from insoluble impurities by filtration, it is added to a solution of 4.3 parts of the addition product of N-ethyl-N-hydroxy-ethyl-m-toluidine to vinylethyl sulphone in dilute hydrochloric acid. Coupling starts immediately and is completed by buffering. The dyestuff formed which possesses the constitution

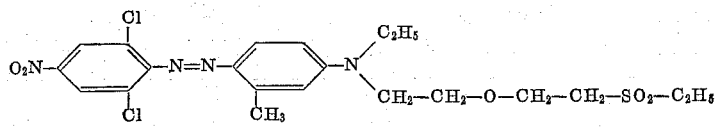

precipitates and is isolated by suction filtration.

The dyestuff yields on terephthalic acid ester fibres, dyed at 120° C. in a closed vessel with the addition of dispersing agents, an intense reddish brown shade of very good fastness properties.

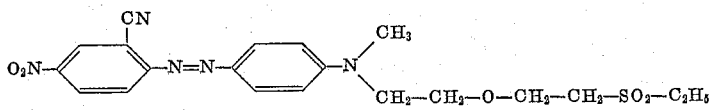

In Table 2 further valuable dyestuffs are listed which are obtainable by suitable replacement of the diazo component used in Example 9. The dyestuffs are characterized by the shade of the dyeing on terephthalic acid ester fibres.

Table 2

| Example | Diazo component | Azo component | Shade |
|---|---|---|---|
| 14 | 2-cyano-4-nitraniline | As Example 13 | Violet. |
| 15 | 3,5-dichloro-4-aminobenzene-sulphonic acid amide. | do | Orange. |
| 16 | 2-chloro-4-nitraniline | do | Red-bordeaux. |
| 17 | 1-amino-2-methoxy-4-nitrobenzene | do | Red. |
| 18 | 1-amino-3-chloro-6-benzene-carboxylic acid amide. | do | Orange. |
| 19 | 1-amino-3-chloro-6-cyanobenzene | do | Do. |
| 20 | 3-phenyl-5-amino-thiodiazole-(1,2,4) | do | Red. |
| 21 | 2-amino-5-nitro-thiazole-(1,3) | do | Blue. |
| 22 | 4-nitro-2-methyl-1-aminobenzene | do | Red. |
| 23 | 2,4-dicyananiline | do | Do. |
| 24 | 1-amino-2,5-dimethoxy-4-cyanobenzene. | do | Orange. |

EXAMPLE 25

3.5 parts of the addition product of 2-aminobenzyl alcohol to vinyl ethyl sulphone are dissolved in 5 parts of concentrated hydrochloric acid and 50 parts of water, and diazotised with 1 part of sodium nitrite dissolved in 10 parts of water. This solution is then added to a solution of 6.1 parts of the addition product of 1 mol of N,N-dihydroxyethyl aniline to 2 mol of vinylethyl sulphone in dilute hydrochloric acid. Upon buffering the solution, coupling starts immediately. The dyestuff formed which possesses the constitution

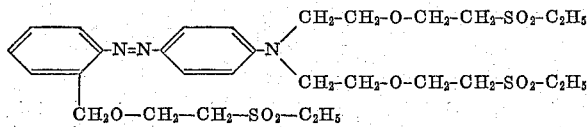

is isolated by suction filtration.

In Table 3 further dyestuffs are listed which may be obtained by suitable replacement of the diazo component used in Example 25. The dyestuffs are characterized by the shade of the dyeing on polyamide fibres.

Table 3

| Example | Diazo component | Azo component | Shade |
|---|---|---|---|
| 26 | 2-cyano-4-nitraniline | As Example 25 | Vilot. |
| 27 | 2-chloro-4-nitraniline | do | Red-bordeaux. |
| 28 | 5-amino-3-phenylthiodiazole-(1,2,4) | do | Ruby-red. |

EXAMPLE 29

2.5 parts of 2-cyano-4-nitraniline are diazotised as described in Example 1. The solution of the diazonium salt is then added to a solution of 2.3 parts of the addition product of N-acetyl-N'-methyl-N'-hydroxyethyl-1,3-phenylenediamine to vinylmethyl sulphone in dilute hydrochloric acid. Coupling starts immediately and is completed by buffering. The dyestuff which possesses the constitution

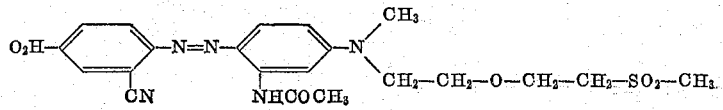

precipitates and is isolated by suction filtration. The dyestuff yields on terephthalic acid ester fibres an intense violet shade.

In Table 4 further valuable dyestuffs are listed which are obtainable by suitable replacement of the diazo component used in Example 29. The dyestuffs are characterized by the shade of the dyeing on terephthalic acid ester fibres.

Table 4

| Example | Diazo component | Azo component | Shade |
|---|---|---|---|
| 30 | 2,4-dicyananiline | As Example 29 | Ruby-red. |
| 31 | 2-chloro-4-nitraniline | do | Bordeaux. |
| 32 | 2,6-dichloro-4-nitraniline | do | Brown. |
| 33 | 3-phenyl-5-amino-thiodiazole-(1,2,4) | do | Red. |
| 34 | 3-ethylmercapto-5-amino-thiodiazole-(1,2,4). | do | Do. |

Example 35

3.5 parts of the addition product of 4-amino-benzyl alcohol to vinylethyl sulphone are dissolved in a mixture of 5 parts of concentrated hydrochloric acid and 50 parts of water, diazotised with 1 part of sodium nitrite dissolved in water, and coupled soda-alkaline with 2.55 parts of 1-phenyl-3-methyl-pyrazolone. The yellow dyestuff which possesses the constitution

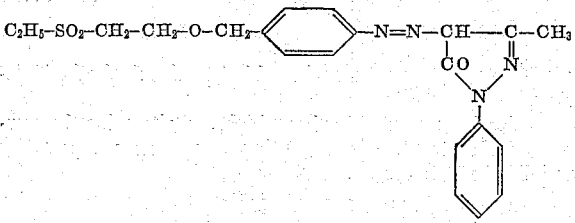

precipitates and is isolated by suction filtration. When dyed on cellulose ester fibres, the dyestuff yields a clear greenish yellow shade of very good fastness to wet processing and food fastness to light.

Example 36

2.5 parts of 2-cyano-4-nitraniline are dissolved in 25 parts of concentrated sulphuric acid and diazotised at 0° C. for 30 minutes with 4.6 parts of nitrosylsulphuric acid. When the solution has been poured into ice water and liberated by filtration from the insoluble impurities, it is added to a solution of 3.9 parts of the addition product of N-methyl-N-hydroxyethyl aniline to butadiene sulphone in dilute hydrochloric acid. The coupling which starts immediately is completed by buffering. The dyestuff thus obtained which possesses the constitution

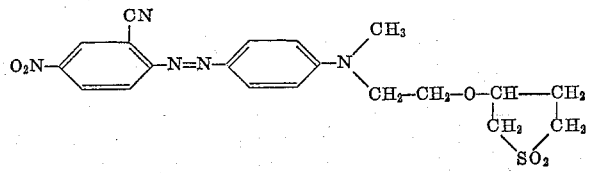

yields on terephthalic acid ester fibres, dyed in conventional manner with the addition of dispersing agents, a clear ruby red shade of very good fastness properties.

The azo component used is prepared in the following manner:

A mixture of 75 parts of N-methyl-N-β-hydroxyethyl-aniline and 0.8 part of sodium methylate is heated to 30° C. and then slowly treated with 60 parts of butadiene sulphone. After a short fall of temperature, the temperature then slowly rises to about 50° C., care being taken that this temperature is not exceeded. The reaction mixture is subsequently stirred at 30–40° C. for a further 3–5 hours and then added with stirring to about 200 parts of water. The aqueous phase containing unreacted butadiene sulphone is separated and the residual viscous portion heated to 140–150° C. in a vacuum in order to remove the unreacted oxethylated amine. 127.5 parts of a yellow oil of the constitution

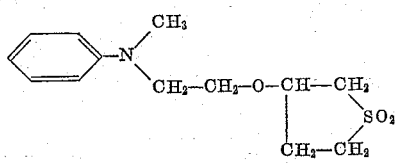

are obtained.

Analysis: N calculated 5.2%, found 5.22%; S calculated 11.9%, found 11.6%.

In Table 5 further valuable dyestuffs are listed which are obtainable by suitable replacement of the diazo component used in Example 36. The dyestuffs are characterized by the shade of the dyeing on terephthalic acid ester fibres.

Table 5

| Example | Diazo component | Azo component | Shade |
|---|---|---|---|
| 37 | 4-thiocyano-1-aminobenzene | As Example 36 | Yellow. |
| 38 | 4-amino-benzaldehyde | do | Orange. |
| 39 | 2,4-dichloraniline | do | Yellow. |
| 40 | 2-amino-benzthiazole | do | Red. |
| 41 | 2-amino-5-methyl-1,3,4-thiodiazole | do | Orange. |
| 42 | 2-amino-5-thiocyano-4-methylthiazole-(1,3). | do | Bordeaux. |
| 43 | 2,4-dicyananiline | do | Red. |

EXAMPLE 44

3 parts of 2,6-dichloro-4-nitraniline are dissolved in 15 parts of sulphuric acid of 60° Baumé and then diazotised at about 40° C. for 30 minutes with 4.6 parts of nitrosylsulphuric acid. After stirring the solution into ice water and liberating it by filtration from insoluble impurities, it is added to a solution of 4.3 parts of the addition product of N-ethyl-N-hydroxyethyl-m-toluidine to butadiene sulphone in dilute hydrochloric acid. Coupling starts immediately and is completed by buffering. The dyestuff formed which possesses the constitution

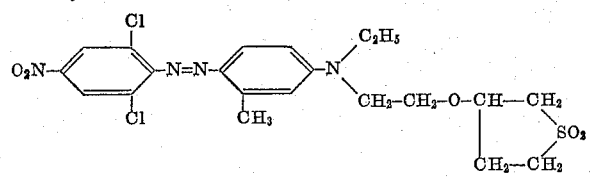

precipitates and is isolated by suction filtration.

On terephthalic acid ester fibres the dyestuff yields, upon addition of dispersing agents at 120° C. in a closed vessel, an intense reddish brown shade of very good fastness properties.

In Table 6 further valuable dyestuffs are listed which are obtainable by suitable replacement of the diazo component used in Example 44. The dyestuffs are characterized by the shade of the dyeing on terephthalic acid ester fibres.

Table 6

| Example | Diazo component | Azo component | Shade |
|---|---|---|---|
| 45 | 2-cyano-4-nitraniline | As Example 44 | Violet. |
| 46 | 3,5-dichloro-4-aminobenzene-sulphonic acid amide. | do | Orange. |
| 47 | 2-chloro-4-nitraniline | do | Bordeaux. |
| 48 | 1-amino-2-methoxy-4-nitro-benzene | do | Red. |
| 49 | 1-amino-3-chloro-6-benzene-carboxylic acid amide. | do | Orange. |
| 50 | 1-amino-3-chloro-6-cyano-benzene | do | Do. |
| 51 | 3-phenyl-5-amino-thiodiazole-(1,2,4) | do | Red. |
| 52 | 2-amino-5-nitro-thiazole-(1,3) | do | Blue. |
| 53 | 4-nitro-2-methyl-1-aminobenzene | do | Red. |
| 54 | 2,4-dicyananiline | do | Do. |
| 55 | 1-amino-2,5-dimethoxy-4-cyano-benzene. | do | Orange. |

EXAMPLE 56

3.5 parts of the addition product of 2-aminobenzyl alcohol to butadiene sulphone are dissolved in 5 parts of concentrated hydrochloric acid and 50 parts of water and diazotised with 1 part of sodium nitrite dissolved in 10 parts of water. This solution is then added to a solution of 6.1 parts of the addition product of 1 mol of N,N-dihydroxy-ethyl aniline to 2 mols of butadiene sulphone in dilute hydrochloric acid. After buffering the solution, coupling starts immediately. The dyestuff formed which possesses the constitution

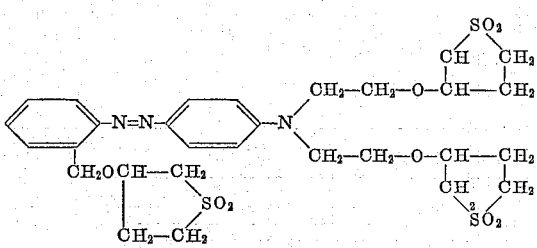

is isolated by suction filtration.

In Table 7 further dyestuffs are listed which may be obtained by suitable replacement of the diazo component used in Example 55. The dyestuffs are characterized by the shade of the dyeing on polyamide fibres.

*Table 7*

| Example | Diazo component | Azo component | Shade |
|---|---|---|---|
| 57 | 2-cyano-4-nitraniline | As Example 56 | Violet. |
| 58 | 2-chloro-4-nitraniline | ___do___ | Red-bordeaux. |
| 59 | 5-amino-3-phenyl-thiodiazole-(1,2,4) | ___do___ | Ruby red. |

EXAMPLE 60

2.5 parts of 2-cyano-4-nitraniline are diazotised as described in Example 36. The solution of the diazonium salt is then added to a solution of 2.4 parts of the addition product of N-acetyl-N'-methyl-N'-hydroxyethyl-1,3-phenylene-diamine to butadiene sulphone in dilute hydrochloric acid. Coupling starts immediately and is completed by buffering. The dyestuff which possesses the constitution

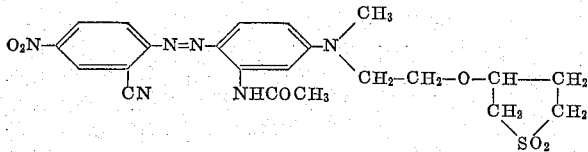

precipitates and is isolated by suction filtration. On terephthalic acid ester fibres the dyestuff yields an intense violet.

In Table 8 further valuable dyestuffs are listed which are obtainable by suitable replacement of the diazo component used in Example 60. The dyestuffs are characterized by the shade of the dyeing on terephthalic acid ester fibres.

*Table 8*

| Example | Diazo component | Azo component | Shade |
|---|---|---|---|
| 61 | 2,4-dicyananiline | As Example 60 | Ruby red. |
| 62 | 2-chloro-4-nitraniline | ___do___ | Bordeaux. |
| 63 | 2,6-dichloro-4-nitraniline | ___do___ | Brown. |
| 64 | 3-phenyl-5-amino-thiodiazole-(1,2,4) | ___do___ | Red. |
| 65 | 3-ethylmercapto-5-aminothiodiazole-(1,2,4). | ___do___ | Do. |

EXAMPLE 66

3.5 parts of the addition product of 4-amino-benzyl alcohol to butadiene sulphone are dissolved in a mixture of 5 parts of concentrated hydrochloric acid and 50 parts of water, diazotised with 1 part of sodium nitrite dissolved in water, and coupled with 2.55 parts of 1-phenyl-3-methylpyrazolone.

The yellow dyestuff which possess the constitution

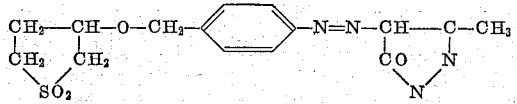

precipitates and is isolated by suction filtration. Dyed on cellulose ester fibres, the dyestuff yields a clear greenish yellow shade of very good fastness to wet processing and good fastness to light.

EXAMPLE 67

2.5 parts of 2-cyano-4-nitraniline are diazotised as described in Example 36. The solution of the diazonium salt is then added to a solution of 3.9 parts of the addition product of N,N-dimethyl-2-amino-benzyl alcohol to butadiene sulphone in dilute hydrochloric acid. Coupling starts immediately and is completed by buffering. The dyestuff formed which possesses the constitution

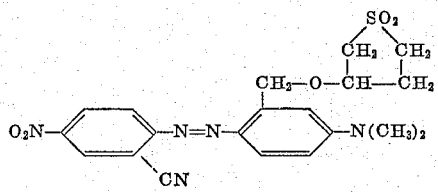

dyes terephthalic acid ester fibres in bluish red shades which are very fast to wet treatment and sublimation.

EXAMPLE 68

4.2 parts of sodium nitrite are dissolved at a maximum temperature of 70° C. in 30 parts by volume of concentrated sulphuric acid, cooled to 10° C. and diluted with 60 parts by volume of glacial acetic acid. Into this mixture there are added at 10° C. in portions 9.9 parts of 4-nitro-2-cyananiline, subsequently diluted with a further 60 parts by volume of glacial acetic acid and stirred at 10° C. for 1–2 hours. The mixture is then poured onto 350 parts of ice, the excess nitrous acid removed and the clear diazo solution combined with a hydrochloric acid solution of 13.7 parts of N-ethyl-N-(methylsulphonylethyl)-aniline. The ice-cold mixture is neutralised with a sodium hydroxide solution to a pH of 4, coupling thus taking place. The dyestuff precipitated in a powdery form and having the formula

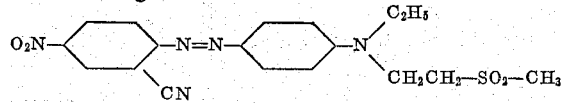

is filtered off with suction, washed with water and dried.

It dyes from an aqueous dispersion polyethylene terephthalate and cellulose ester fibres in strong, intense bluish red shades of very good fastness to wet treatment, sublimation and light.

N-ethyl-N-(methylsulphonylethyl)-aniline used as coupling component may be obtained, for example, as follows: Into 125 parts of N-ethyl-aniline there are added dropwise in an oil bath heated to 120° C. with stirring and passing over nitrogen within about ½ hours 65 parts of methyl-(β-chlorethyl)-sulphone. The internal temperature is maintained at about 135° C. due to the reaction heat. The mixture is subsequently stirred at 100° C. for a further 6 hours and after cooling stirred for 1–2 hours with 100 parts by volume of benzene and 23 parts of calcined soda. After termination of the $CO_2$ evolution the precipitated common salt is filtered off, the benzene distilled off from the filtrate and the residue fractionated by distillation in a high vacuum: first runnings 68 parts of ethyl aniline (B.P. 57° C./0.1 mm. Hg), main fraction, B.P. 184–185° C./0.1 mm. Hg, 92 parts of N-ethyl - N - (methylsulphonylethyl)-aniline (a pale yellow oil solidifying in crystalline form).

EXAMPLE 69

6 parts of 2,6-dichloro-4-nitraniline are dissolved with stirring in 27 parts by volume of concentrated sulphuric acid. A solution of 2.1 parts of sodium nitrite in 15 parts by volume of concentrated sulphuric acid are added thereto dropwise with ice cooling. The mixture is stirred at about 5° C. for 30 minutes and then poured onto 150 parts of ice. After removing excess nitrous acid, the resultant clear diazo solution is allowed to run into a hydrochloric acid solution of 7.3 parts of N - ethyl - N - (methylsulphonylethyl)-m-toluidine in 100 parts by volume of water. After buffering with ice cooling with sodium acetate and a sodium hydroxide solution to a pH valeu of 4, coupling occurs. The precipitated powdery dyestuff is filtered off with suction, washed with water and dried. It dyes from an aqueous dispersion polyester fibres in strong, intense reddish brown shades of very good fastness to wet treatment, sublimation and light.

N-ethyl-N-(methylsulphonylethyl)-m-toluidine used as coupling component may be obtained according to the instructions given in Example 68, paragraph 2 when instead of 125 parts of N-ethylaniline, 140 parts of N-ethyl-m-toluidine are reacted with 65 parts of methyl-$\beta$-chlorethyl-sulphone. The product goes over at 171° C./0.05 mm. Hg as a viscous, pale-yellowish liquid which solidifies in crystalline form after a short time.

The dyeuffs described in the following table are produced according to the data given in the preceding examples by coupling of the corresponding diazotised amines with the appropriate coupling components.

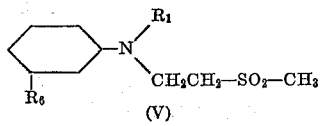

(V)

| Example | Diazo-component | Coupling-component | Shade of dyeing of fabric of— | | |
|---|---|---|---|---|---|
| | | | Cellulose-acetate | Polyethylene-terephthalate | Polyamide |
| | | (V) | | | |
| 70 | 4-aminobenzoic-acid methyl ester. | $R_1=CH_3$ $R_6=H$ | Reddish yellow. | Reddish yellow. | Reddish yellow. |
| 71 | 4-aminobenzene-sulphonic acid-dimethylamide. | $R_1=CH_3$ $R_6=H$ | do | do | Do. |
| 72 | 2-amino-4-nitro-benzoic acid methyl ester. | $R_1=CH_3$ $R_6=H$ | Reddish yellow. | do | |
| 73 | 2,4-dicyananiline | $R_1=CH_3$ $R_6=H$ | Reddish orange. | | Reddish orange. |
| 74 | 4-nitraniline | $R_1=C_2H_5$ $R_6=H$ | | Reddish orange. | |
| 75 | 2-chloro-4-nitraniline | $R_1=C_2H_5$ $R_6=H$ | Yellowish red. | Reddish yellow. | Bluish red. |
| 76 | 2,4-dicyananiline | $R_1=C_2H_5$ $R_6=H$ | Orange | | Orange. |
| 77 | 2-chloro-4-nitraniline | $R_1=CH_2CH_2OH$ $R_6=H$ | Yellowish red. | Yellowish red. | |
| 78 | 2-cyano-4-nitraniline | $R_1=CH_2CH_2OH$ $R_6=H$ | Bluish red | Bluish red | |
| 79 | 3-nitraniline | $R_1=CH_2CH_2OH$ $R_6=H$ | Reddish yellow. | Reddish yellow. | Reddish yellow. |
| 80 | 2,4-dicyanoaniline | $R_1=CH_2CH_2OH$ $R_6=H$ | Orange | | |
| 81 | 2-amino-4-nitro-benzoic acid methyl ester. | $R_1=CH_2CH_2OH$ $R_6=H$ | Reddish yellow. | Reddish yellow. | |
| 82 | 4-aminoazobenzene | $R_1=CH_2CH_2OH$ $R_6=H$ | Yellowish orange. | Orange | Reddish orange. |
| 83 | 4-nitraniline | $R_1=C_2H_5$ $R_6=CH_3$ | Reddish orange. | Reddish orange. | Yellowish orange. |
| 84 | 2-aminobenzthiazole | $R_1=C_2H_5$ $R_6=CH_3$ | Scarlet | Yellowish scarlet. | Bluish scarlet. |
| 85 | 3-nitraniline | $R_1=C_2H_5$ $R_6=CH_3$ | Reddish yellow. | Reddish yellow. | Reddish yellow. |
| 86 | 2,4-dicyanoaniline | $R_1=C_2H_5$ $R_6=CH_3$ | Reddish orange. | Yellowish scarlet | Scarlet. |
| 87 | 3-phenyl-5-amino-thiodiazole-1,2,4. | $R_1=C_2H_5$ $R_6=CH_3$ | Bluish red | Bluish red | |
| 88 | 2,4-dinitraniline | $R_1=C_2H_5$ $R_6=CH_3$ | | Ruby | Bluish bordeaux. |
| 89 | 2-methoxy-4-nitraniline | $R_1=C_2H_5$ $R_6=CH_3$ | | Yellowish red. | Bluish red. |
| 90 | 2-cyano-4-nitraniline | $R_1=-CH_2CH_2-O-OC-CH_3$ $R_6=H$ | Bluish red | Bluish red | Reddish bordeaux. |
| 91 | 2,6-dichloro-4-nitraniline | (phenyl-NH-$CH_2CH_2-SO_2-CH_3$) | Orange brown. | Orange brown. | Brick red. |
| 92 | 2-cyano-4-nitraniline | (phenyl-N($CH_2CH_2-O-CH_2CH_2-SO_2-CH_3$)$_2$) | Bluish red | Bluish red | |

We claim:
1. A dyestuff of the formula

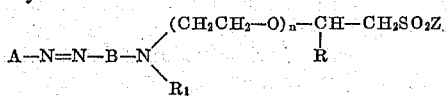

wherein B is a component of the benzene series, $R_1$ is —$C_2H_5$ and $n$ is an integer of 0–1; when $n$ is 0, R is H, Z is lower alkyl, and A is a component having the formula

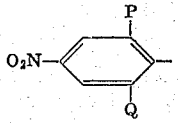

wherein P is a member selected from the group consisting of hydrogen and chlorine, and Q is a member selected from the group consisting of chlorine and cyano; and when $n$ is 1, $R_1$ is a member selected from the group consisting of hydrogen and lower alkyl, Z is lower alkyl of 1–3 carbon atoms, R is H, and R and Z, in combination, form a ring having the general formula

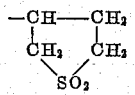

and A is a member selected from the class consisting of a component of the benzene, thiazole and thiodiazole series; the dyestuff being free of sulfonic acid and carboxylic acid groups.

2. The dyestuff of the formula

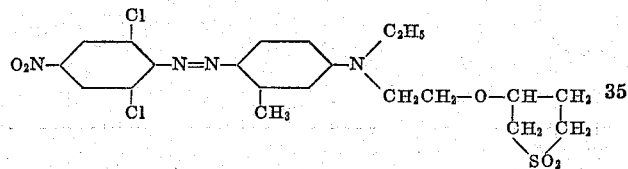

3. The dyestuff of the formula

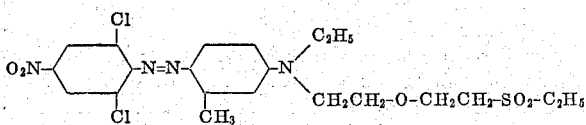

4. The dyestuff of the formula

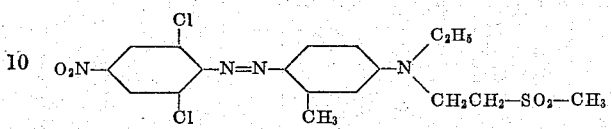

5. The dyestuff of the formula

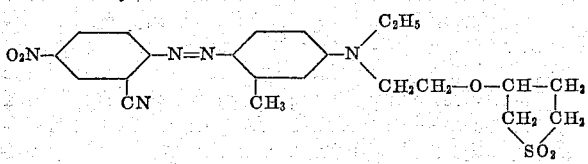

6. The dyestuff of the formula

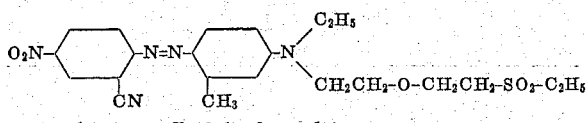

7. The dyestuff of the formula

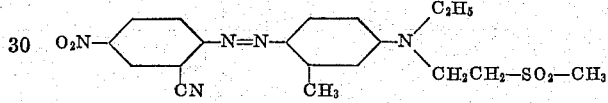

References Cited in the file of this patent
UNITED STATES PATENTS 2,830,043    Merian                  Apr. 8, 1958
2,955,901    Kruckenberg          Oct. 11, 1960